United States Patent [19]
DeJule et al.

[11] Patent Number: 5,345,321
[45] Date of Patent: Sep. 6, 1994

[54] COMPACT POLARIZATION DEPENDENT OPTICAL SWITCHING UNITS

[75] Inventors: Michael C. DeJule, Clifton Park, N.Y.; Thomas L. Credelle, Los Gatos, Calif.; Nabeel A. Riza, Clifton Park; Donald E. Castleberry, Schenectady, both of N.Y.

[73] Assignee: General Electric Company, Schenectady, N.Y.

[21] Appl. No.: 994,012

[22] Filed: Dec. 21, 1992

[51] Int. Cl.$^5$ .................... G02F 1/1335; H01Q 3/22
[52] U.S. Cl. ........................................ 359/42; 359/41; 359/140; 342/375
[58] Field of Search .............. 359/42, 41, 140, 251; 342/374, 375

[56] References Cited

U.S. PATENT DOCUMENTS

| | | | |
|---|---|---|---|
| 4,516,837 | 5/1985 | Soref et al. | 359/42 |
| 5,117,239 | 5/1992 | Riza | 342/375 |
| 5,231,405 | 7/1993 | Riza | 342/375 |

FOREIGN PATENT DOCUMENTS

| | | | |
|---|---|---|---|
| 0182423 | 9/1985 | Japan | 359/42 |
| 0151612 | 7/1986 | Japan | 359/41 |

OTHER PUBLICATIONS

Dolfi et al., "Two-dimensional Optical Architecture for Time-Delay Beam Forming in a Phased-array Antenna", Optics Letters, Feb. 15, 1991, vol. 16, No. 4, pp. 255–257.

Dolfi et al., "Optically Controlled True Time Delays for Phased Array Antenna", SPIE vol. 1102, Optical Technology for Microwave Applications IV (1989), pp. 152–161.

*Primary Examiner*—William L. Sikes
*Assistant Examiner*—Huy Mai
*Attorney, Agent, or Firm*—Donald S. Ingraham; Marvin Snyder

[57] ABSTRACT

A compact optical switching unit includes a spatial light modulator coupled to a delay assembly such that incident light beams are respectively selectively directed along either a direct path or a delay path dependent on the linear polarization of the light beam. The delay assembly includes a light deflection device, such as a polarizing beam splitter, coupled to a delay path apparatus, such as mirror prisms or fiber optic cable. A compact and readily fabricated cascade of optical switching units includes polarizing beam splitter blocks and polarization rotation switch blocks, a portion of which constitutes the polarizing beamsplitters and spatial light modulators in respective optical switching units sequentially optically coupled. Delay path apparatuses disposed along an axis orthogonal to both the axis of beams passing along a direct path through polarizing beam splitter switches on the direct path and the axis between respective optical switching units result in a compact optical architecture.

24 Claims, 6 Drawing Sheets

COMPACT POLARIZATION DEPENDENT OPTICAL SWITCHING UNITS

RELATED APPLICATIONS AND PATENTS

This application is related to the application entitled "Compact Polarization Independent Optical Switching Units", Ser. No. 07/994,011, filed concurrently with this application and assigned to the assignee of the present application, and which is incorporated herein by reference.

BACKGROUND OF THE INVENTION

Optical signal processing systems are used to manipulate the characteristics of optical signals, or light beams, to enable information or signals to be processed. For example, the direction, intensity, polarization, phase, or a combination of these characteristics of a light beam may be manipulated by appropriate equipment so that the manipulated characteristics represent the desired processing of the optical signal. For example, optical signal processing systems can be advantageously used for controlling phased array radars. In such a system, differentially time-delayed optical signals can be generated to establish selected time delays between individual optical signal beams, and the optical signals can then be converted to electrical signals to drive the antenna array with the desired sequential actuation of the transmitting antenna elements.

An essential component in most optical processing systems, such as phased array antenna controllers, is an efficient light switch. A key characteristic of a light switch used in a signal processing system, in which the processed light must commonly pass through many switches, is the amount of optical loss or attenuation that the light beam experiences in passing through the switch. A commonly used light switch is a lithium niobate type of switch, which, although it has relatively fast switching times, typically also has about 3 dB light loss per switch. Thus, for example, if an optical signal passed through only seven switches in a signal processing system, it would lose 21 dB, that is, the light amplitude of the output signal drops to 1/128th of the input amplitude.

One efficient low loss light switch includes a beam splitter and a liquid crystal array to selectively control the polarization of light beams entering the beamsplitter. One example of switching using polarizing beamsplitters (PBSs) and liquid crystal arrays to selectively control the polarization of light entering the PBSs is disclosed in U.S. Pat. No. 5,117,239 of N. Riza, issued May 26, 1992 and which is assigned to the assignee of the present application and incorporated herein by reference. For example, separate spatial light modulators (SLMs) comprising arrays of liquid crystals can be paired with sets of paired polarizing beam splitters in optical time delay units such that light passing through the unit passes along either a direct path or a delay path dependent on the polarization of the light.

It is desirable that switching units in optical signal systems have relatively low attenuation, be of compact size, rugged, readily fabricated, and adapted to processing a large number of separate signal light beams as would be necessary for operation of a phased array antenna system. It is further desirable, from the standpoint of manufacturing ease and efficiency, that each optical switch comprise as few optical devices, such as beamsplitters, as practicable. Additionally, it is desirable to have a switching unit that can readily be fabricated to produce a small time delay.

It is accordingly an object of this invention to provide an optical switching unit having relatively low light attenuation and that is readily adapted to use in a cascade of other optical processing devices.

It is a further object of this invention to provide an optical switching unit that is compact and rugged and that can be readily fabricated in a cascade of similar devices.

It is a still further object of this invention to provide an arrangement for an optical switching unit that is readily adapted to generating small time delays between respective optical signal beams.

SUMMARY OF THE INVENTION

In accordance with this invention an optical signal control system is provided which includes at least one optical switching unit having a spatial light modulator (SLM) coupled to a delay assembly. In each delay assembly a delay path apparatus, such as an optical fiber strand or a corner prism/mirror arrangement, is coupled to a light deflection device having a single polarizing beam splitter (PBS) and which is disposed such that, dependent on the linear polarization of the light beams incident on the PBS, the incident light passes along a direct path through the PBS or is deflected such that it passes along a delay path through the delay assembly. The spatial light modulator comprises an array of liquid crystal pixels that are individually controllable to select the linear polarization of the light beams passing from each respective pixel and thereby determine whether a light beam passes along the direct path or delay path in each respective optical switching unit. The delay assembly can be coupled to a PBS in a respective optical switching unit such that an optical signal passing along the delay path reenters the same PBS in which it was deflected into the delay path or, alternatively, the delay assembly can be coupled to respective PBSs disposed in sequentially arranged optical switching units such that an optical signal deflected onto the delay path in one PBS is directed into the PBS in a sequentially adjoining optical switching unit.

In an alternative embodiment of this invention the optical architecture is disposed to use light deflection in three dimensions to provide a "folded" arrangement of optical switching units to provide a compact cascade arrangement of optical switching units. In this embodiment, multiple optical switching units are coupled together sequentially along a first axis, and each optical switching unit comprises at least one PBS optically coupled to at least one spatial light modulator (SLM) and a delay path apparatus optically coupled to the PBS. Each PBS has a direct path input face and an output face disposed opposite to one another along a second axis, and further has first and second deflection path faces disposed opposite one another along a third axis. The first, second, and third axes are each orthogonal to the other. The PBSs and SLMs in sequentially adjoining optical switching units may comprise portions, respectively, of contiguous segments of a beam splitter block and a polarization rotator switch block. In this arrangement, light passing between sequential optical switching units in the cascade is directed along the first axis; light passing along the direct path through an optical switching unit passes along the second axis; and light deflected into the delay path is deflected along the third axis to enter the delay path.

In another embodiment of the present invention, a cascade of sequentially coupled optical switching units is arranged so that light is only deflected along two axes. Each optical switching unit includes one SLM coupled to a delay assembly and the SLMs of sequentially coupled optical switching units are disposed along a first axis in a row. Each delay assembly includes a pair of PBSs and a delay path apparatus to provide the delay path; the delay assemblies for alternating ones of the sequentially coupled optical switching units are disposed along a second axis, orthogonal to the first axis, on opposite sides of the row of SLMs.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
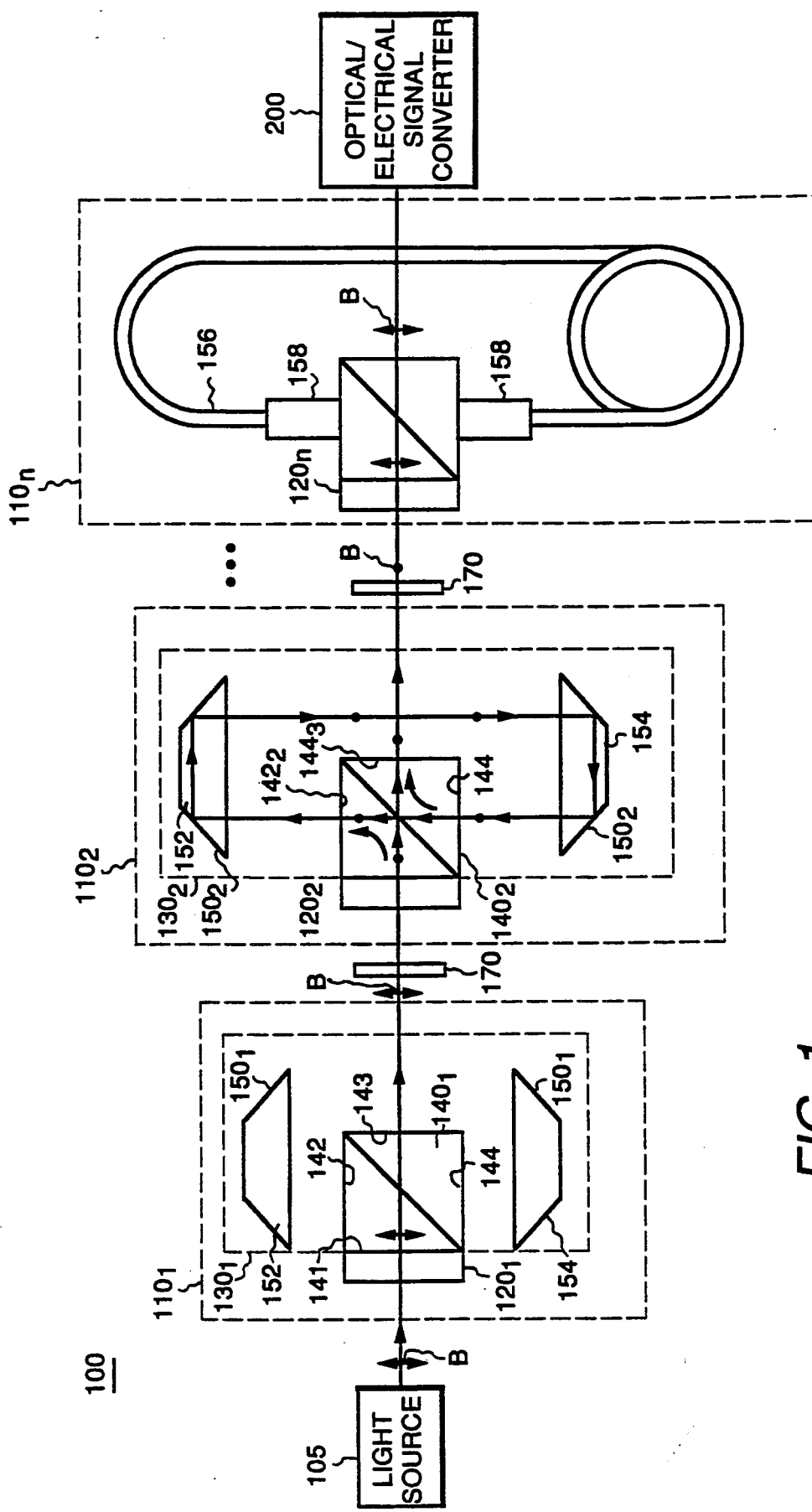
FIG. 1 is a schematic diagram of a first embodiment of an optical signal processing system comprising the present invention.

FIG. 1 illustrates a portion of an optical signal processing system 100 as used in a phased array radar or the like and which comprises a light source 105, a plurality of optical switching units $110_1$–$110_n$ optically coupled in a cascade arrangement, and an optical/electrical signal conversion circuit 200. As used herein, "cascade arrangement" refers to two or more components optically coupled such that light beams can pass sequentially from one component to the next component to which it is coupled.

Optical signal processing system 100 typically is used to generate a number of differentially time delayed optical signals (or light beams) that, when converted to corresponding electrical signals, drive respective elements in an antenna array (not shown). Light source 105 typically comprises a laser adapted to provide polarized light beams of the appropriate intensity required for use in the processing system. Light source 105 typically further comprises one or more collimating lenses (not shown) disposed to receive light from the laser and to collimate the light into a plurality of collinear light beams which pass into first optical switching unit $110_1$ (for ease of description and reference to the figures, reference to a specific switching unit or component thereof includes a subscript denoting the particular switching unit in the cascade). Optical/electrical conversion circuit 200 typically comprises photodetectors and associated electrical components, such as amplifiers, mixers, and filters (not shown) to generate electrical signals corresponding to the processed optical signals.

Each optical switching unit 110 comprises a respective spatial light modulator (SLM) 120 optically coupled to a delay assembly 130, which in turn comprises a light deflection device 140 optically coupled to a delay path apparatus 150. Spatial light modulator 120 typically comprises a two-dimensional array of liquid crystal pixels which are individually controllable and comprise twisted or birefringent nematic liquid crystals, ferro-electric liquid crystals, or the like. Each pixel is illuminated by at least one light beam passing from light source 105 (for ease of discussion, it will be assumed that one light beam passes through each pixel). The pattern of the two-dimensional (2-D) array of liquid crystal pixels corresponds to the desired electrical output, for example, the pattern typically corresponds to the pattern of the 2-D array of antenna elements that are actuated by independent electrical signals generated by optical processing system 100.

In accordance with this embodiment of the invention, in each optical switching unit 110 a respective SLM 120 is optically coupled to a respective single polarizing beam splitter (PBS) 140. For purposes of explanation of the present invention, and not limitation, a cube PBS is described in which light is typically deflected at 90° angles, dependent on its linear polarization. Alternatively, other types of PBSs can be used, such as Thompson PBSs, in which the deflection angle of linearly polarized light is other than 90°, with the appropriate adjustment of the optical architecture to adjust for the different light paths. As used herein, "PBS" refers to the entire PBS assembly, not just the interface of the prisms at which light beam separation occurs.

Each cube PBS is disposed such that a first pair of opposing faces comprising a switching unit input face 141 and a switching unit output face 143 are disposed perpendicular to a first axis of the PBS that corresponds to a direct path of the light passing from each respective SLM 120 into its respective PBS 140 through input face 141 and thence to output face 143. Further, in each PBS 140 a second pair of opposing faces comprising a respective delay path entry face 142 and a respective delay path exit face 144 are disposed along a second axis that is orthogonal to the first axis of the PBS, and which corresponds to the path that light follows when passing out of and returning to the respective PBS along the delay path. For example, the PBS in each respective delay assembly 110 is disposed so that light of a predetermined linear polarization is deflected onto the delay path and light of the opposite, or orthogonal, linear polarization passes through the PBS on a direct path substantially without any deflection.

Each delay path apparatus 150 comprises a first mirror prism 152 and a second mirror prism 154. Alternatively, similar light deflection devices such as a fiber optic line 156 (illustrated in delay assembly $110_n$) or the like can be used for the delay path apparatus. Each delay path apparatus is coupled to a respective light deflection device such that light deflected by 90° in PBS 140 is routed from delay path entry face 142 along the delay path and back to delay path exit face 144 such that the deflected light reenters the same PBS 140 passing along the second axis of the PBS (i.e., orthogonal to the direct path). A lens 158 such as a GRIN (graded index) lens (such as a SELFOC lens or the like) is advantageously used to couple light beams from the PBS to each optical fiber used as part of a respective delay path apparatus. The distance between respective mirror prisms 152, 154, or, alternatively, the length of fiber optic cable 156, as appropriate, determines the length of the delay path along which the deflected light beam must travel before reentering PBS 140 and thus determines the amount of time delay a particular delay assembly 110 imparts to a deflected beam.

In operation, collimated light of a known linear polarization from light source 105 enters the cascade of optical switching units at first optical switching unit $110_1$. Operation of the optical signal processing system necessitates that collimation of the light beams be maintained as it progresses through the cascade of optical switching units; a lenslet array 170 disposed in the path of the light beams passing between optical switching units maintains appropriate collimation. Alternatively, lenslet arrays can also be positioned in delay assemblies or other areas of the optical architecture of a device comprising the present invention.

The linear polarization of each light beam is selected as it passes through its respective pixel in SLM $120_1$, and, dependent on the linear polarization, the light beam is directed along either the direct path or the delay path of optical switching unit $110_1$. Similarly, in each sequential optical switching unit 110, the linear polarization of each light beam emerging from the previous optical switching unit is known based upon previous manipulation of the beam's polarization in the preceding optical switching units, and thus as each respective beam passes through the respective SLM in each optical switching unit the polarization orientation of the beam can be further manipulated as necessary to direct the beam along the desired path in a given optical switching unit.

By way of example and not limitation, a representative light beam "B" is illustrated in FIG. 1 entering optical switching unit $110_1$. This light beam is illustrated as being "p" or horizontally linearly polarized (the electric vector of the light is parallel to the plane of incidence, i.e., the plane of the page as illustrated in FIG. 1 and indicated by the twin headed arrows shown on the light beam line). For purposes of illustration only, the pixel in SLM $120_1$ (for ease of discussion, particular components in a given optical switching unit will be referenced by the subscript of the respective optical switching unit) through which light beam B passes is shown to allow p-polarized light to pass through with its polarization unaltered, PBS $140_1$ is disposed such that p-polarized light passes undeflected, and thus undelayed, through the PBS along the direct path.

As beam B enters second optical switching unit $110_2$, it passes though a predetermined respective pixel in SLM $120_2$, and, for purposes of illustration, its polarization orientation is rotated by 90° such that the beam is now s-polarized, or vertically polarized (extending perpendicularly out of the plane of the page, illustrated by the round circles on the beam line). Light of this polarization is deflected by 90° in $PBS_2$ towards first mirror prism unit 152 in delay path apparatus $150_2$ (as indicated by a curved arrow). Beam B is then deflected in mirror prism unit 152 such that it is directed to second mirror prism unit 154 and thence back into PBS $140_2$ at delay path exit face 144. S-polarized light entering PBS $140_2$ at delay path exit face 144 along the second axis of the PBS is deflected in PBS $140_2$ by 90° back onto a path oriented along the first axis or the direct path line through the PBS. Beam B, which is still s-polarized per this example, then passes into the next sequential optical switching unit in which the respective liquid crystal pixel in the SLM is controlled to select the polarization orientation desired to cause the beam to pass directly through or be deflected along the delay path of that optical switching unit. For example, in FIG. 1, the s-polarized beam entering $n^{th}$ optical switching unit $120_n$ is shown undergoing a polarization rotation to p-polarized light such that it passes along the direct path through optical switching unit $120_n$.

Thus a plurality of light beams necessary for generating the ultimate control signal for the device in which this system is employed, a radar for example, pass simultaneously into the first optical switching unit. Respective manipulation of the linear polarization of each light beam in each optical switching unit determines whether a respective light beam passes along the delay path or the direct path in a particular optical switching unit. The cumulative effect of these manipulations provides, at the output of the cascade of optical switching devices, a plurality of differentially time delayed optical signals. Conversion of these optical signals to corresponding electrical signals in converter 200 produces electrical signals that, for example, differentially actuate a predetermined one of the elements in an antenna array to generate a desired beamform.

Figure 2:
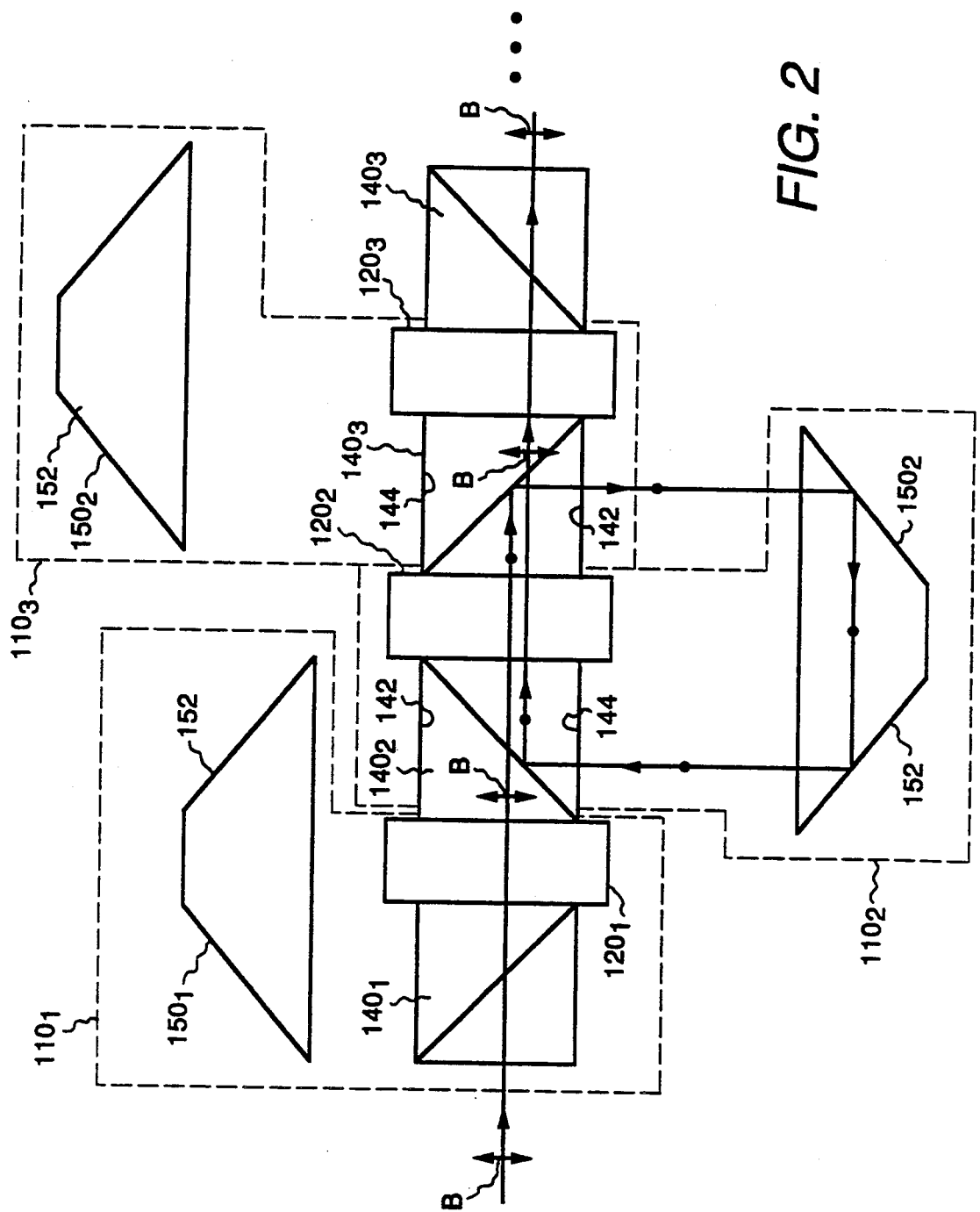
FIG. 2 is a schematic diagram of a portion of a second embodiment of an optical signal processing system comprising the present invention.

A second embodiment of the present invention is illustrated in FIG. 2. The components in this embodiment are as described above with respect to FIG. 1 with the exception that each optical switching unit 110 delay path apparatus 150 comprises only one mirror prism 152 which is disposed to receive light beams deflected from the PBS in the next succeeding optical switching unit in the cascade and to direct these light beams into its respective PBS. Thus two or more optical switching units, as the term is used with respect to this embodiment, must be optically coupled as described herein to accomplish the switching of a light beam through a given delay path. This arrangement allows a reduction in the total number of PBSs used in a cascade as delay path switching evolution is accomplished by "sharing" PBS in sequentially coupled optical switching units as more fully described below.

As illustrated in FIG. 2, first optical switching unit $110_1$ comprises a PBS $140_1$ coupled to a respective SLM $120_1$, and further delay path apparatus $150_1$ comprises a first mirror prism 152. SLM $120_1$ is coupled to PBS $140_2$, that is, the SLM in one optical switching unit is coupled to the PBS in the next succeeding optical switching unit in the cascade. Thus a light beam entering optical switching unit 110 is first incident on the respective PBS in that optical switching unit. Delay path apparatuses 150 in respective optical switching units are disposed on opposite sides of the cascade of respective PBSs and SLMs in the optical switching units; for example, delay path apparatus $150_1$ is disposed on the opposite side of the cascade from delay path apparatus $150_2$ and so forth for each successive delay path apparatus in an alternating arrangement. In this arrangement the deflection orientation of the PBS (that is, the orientation of the optical interface in the PBS that determines the direction in which light of a predetermined polarization is deflected) in each succeeding optical switching unit is disposed such that light of a predetermined polarization to be deflected in the PBS is deflected in the direction of the respective delay assembly 150 disposed to receive light from that PBS.

Further explanation of the arrangement of this embodiment is provided by an example illustrating operation of the device. By way of example and not limitation, an incoming light beam B, for example from light source 105 (not shown) is p-polarized, as shown by the double-headed arrow on the representative light beam line. PBS $140_1$ is disposed such that beam B passes undeflected through it into SLM $120_1$. In this example, SLM $120_1$ is set so that the polarization of beam B is not rotated and thus the p-polarized beam passes undeflected through PBS $140_2$ into SLM $120_2$, which in this example is set to rotate the polarization of beam B to be s-polarized. PBS $140_3$ is disposed so that s-polarized beam B is deflected by 90° into delay assembly $150_2$; light entering mirror prism 152 is deflected by 180° onto a path that causes it to be incident on delay path exit face 144 of PBS $140_2$. The orientation of PBS $140_2$ is such that the s-polarized light entering through delay path exit face 144 along the second axis of the PBS is deflected by 90° back into SLM $120_2$. For ease of illustration, beam B is shown slightly offset from its original path through the PBS, although in practice the components of the switching unit are aligned so that the delayed beam would be aligned along the same path as it followed when first incident on the PBS. The respective pixel of SLM $120_2$ through which beam B passes after being deflected along the delay path is still set to rotate the linear polarization of the light by 90°; hence the polarization of the beam emerging from the delay path, upon passing through SLM $120_2$ a second time, is rotated to again become p-polarized. The orientation of PBS $140_3$ is such that polarized light passes directly through PBS $140_3$ to be incident on SLM $120_3$. As discussed above with respect to FIG. 1, the polarization of each of the plurality of beams passing through the cascade of optical switching units can be manipulated to cause the beam to pass directly through or be deflected to the delay path in any one of the optical switching units, and thus the desired delay can be imparted to any particular light beam.

The arrangement of FIG. 2 thus provides an optical switching unit that requires only one PBS and one associated mirror prism 152, and allows for compact construction with adjoining PBSs and SLMs in sequentially coupled optical switching units.

Figure 3:
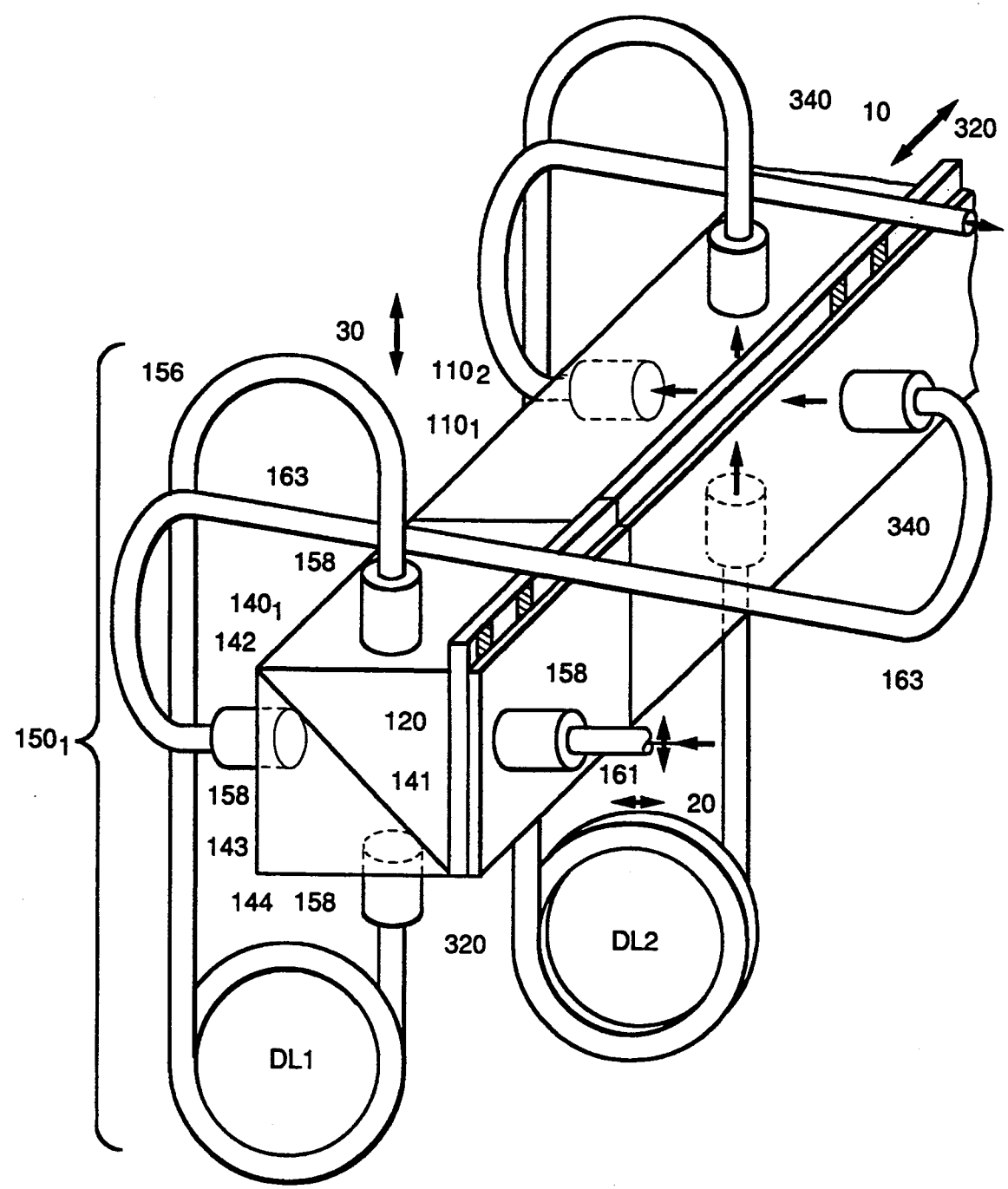
FIG. 3 is a perspective view of a of a portion of a third embodiment of an optical signal processing system comprising the present invention.

A third embodiment of the present invention is illustrated in FIG. 3. The nature and operation of the components in this embodiment are as described above with respect to FIGS. 1 and 2 except as noted in the following discussion. In this embodiment a plurality of optical switching units 110 (two exemplary units $110_1$–$110_2$ are shown) are sequentially optically coupled in a cascade along a first axis 10. Each optical switching unit 110 comprises a respective SLM 120, a light deflection device 140 comprising a single PBS, and a delay path apparatus 150 comprising a fiber optic cable 156 for each separate light beam to be processed. Advantageously, each fiber optic cable 156 is optically coupled by respective lenses 158, such as GRIN or SELFOC lenses, to components in the system in the optical switching units.

Individual PBSs advantageously constitute a portion of a beamsplitter block 340, that is an integral elongated beamsplitter, such that one block can be fabricated and segments of the block can then be used to provide at least a portion of the respective PBSs in sequentially coupled optical switching units. Similarly, individual SLMs advantageously constitute a portion of a polarization rotation switch block 320. Switch block 320 comprises an elongated substrate on which respective arrays of liquid crystals are disposed with the associated address circuitry for individual pixels. Switch block 320 and beamsplitter block 340 are typically coupled in physical contact with each other and the respective fiber optic cables 156 for the light beams to be processed am optically coupled to the respective optical switching unit segments of each block.

A representative optical fiber is illustrated in FIG. 3; only one optical fiber is shown for ease of illustration, although an optical signal processing system in accordance with this invention would typically comprise a plurality optical fibers corresponding to the number of separately processed light beams that are necessary to generate the desired output control signals from the processing system. An optical fiber input segment 161 is disposed along a second axis 20 that is substantially orthogonal to first axis 10 such that the light beam in the fiber is coupled to a respective predetermined pixel (not shown) in SLM $120_1$ and passes into PBS $140_1$ along that axis and through direct path input face 141. An inter-switching unit fiber optic coupling segment 163 is disposed between output face 143 and the input of the next sequentially coupled optical switching unit in the cascade. Fiber optic cable delay path segment 156 is disposed to couple light between delay path input face 142 and delay path exit face 144. PBS $140_1$ is disposed such that light beams having one predetermined polarization pass through the PBS on a direct path and into fiber optic cable inter-switching unit coupling segment 163; light having the opposite linear polarization is deflected in the PBS by 90° in the direction of a third axis 30 onto the delay path such that it passes through delay path entry face 142 into fiber optic cable delay segment 156. Light passing along the delay path is directed by cable delay segment 156 into PBS $140_1$ at delay path exit face 144 substantially oriented along third axis 30 such that the light is deflected by 90° to pass from the PBS at exit face 143 into fiber optic coupling segment 163.

In this three dimensional (3-D), or "folded", integrated arrangement illustrated in FIG. 3 light is directed along the three mutually orthogonal axes 10, 20, and 30 as it passes along the respective direct paths, delay paths, and inter-switching unit coupling segments. This arrangement allows compact packaging of the cascade and presents an arrangement that is readily fabricated with the use of the beamsplitter and polarization rotation switch blocks.

Figure 4:
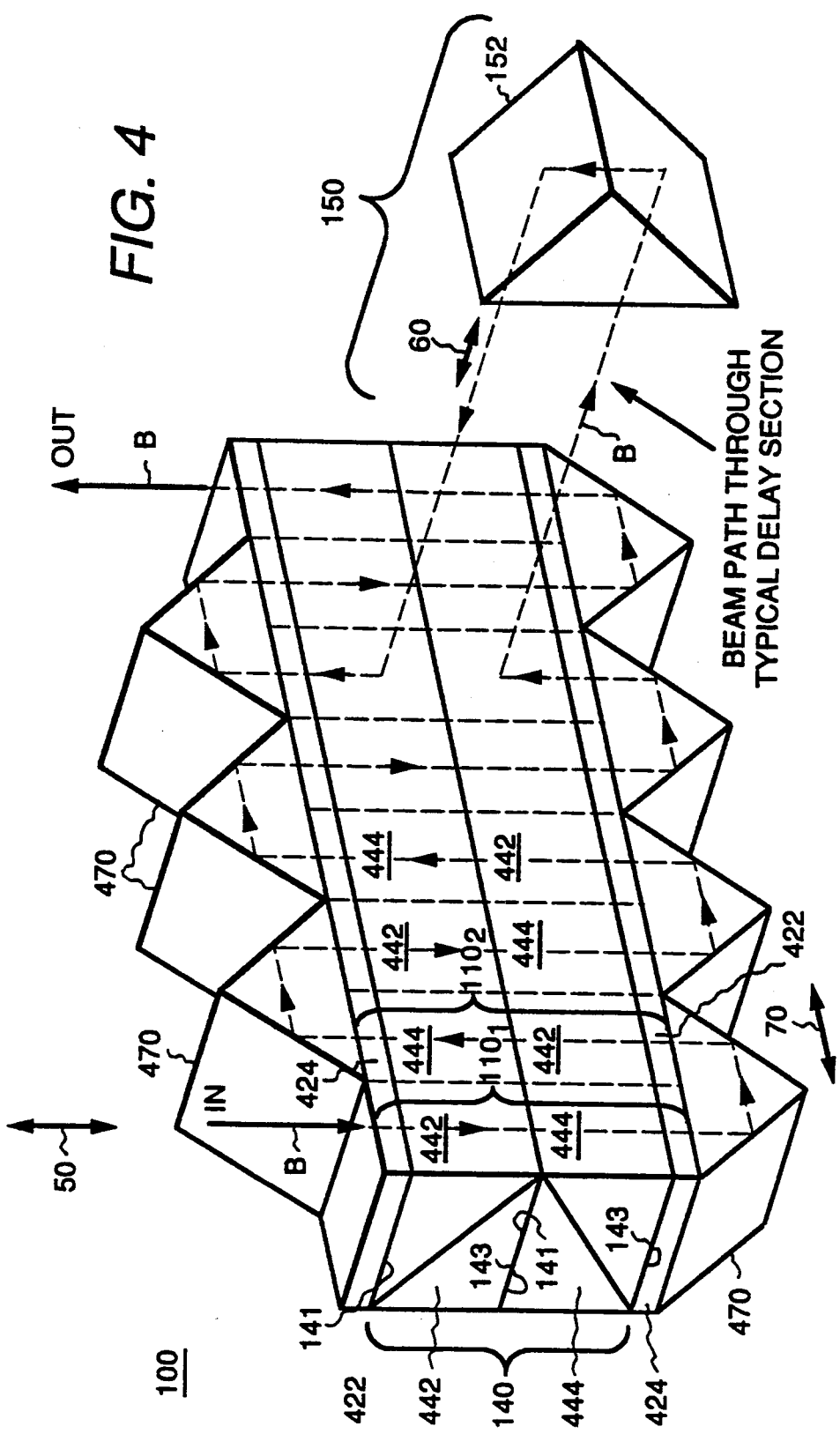
FIG. 4 is a perspective view of a portion of a fourth embodiment of an optical signal processing system comprising the present invention.

The three dimensional arrangement of a folded cascade of optical switching units in accordance with this invention can also be used with the type of time delay units described in the patent of N. Riza, U.S. Pat. No. 5, 117,239, assigned to the assignee of the present invention, in which a pair of polarizing beamsplitters is coupled to a time delay unit in each optical switching unit. One example of such a folded device is illustrated in FIG. 4, which is similar to the device in FIG. 3 described above with the following exceptions. Light deflection device 140 in each optical switching unit 110 comprises a first and a second PBS 442, 444, respectively, which are optically coupled in contact with each other such that respective output face 143 of first PBS 442 is coupled to and in contact with respective input face 141 of second PBS 444. Additionally, in each optical switching unit 110 a respective first SLM 422 is coupled to input face 141 of first PBS 442, typically such that these items contact one another, and a respective second SLM 424 is coupled to second PBS 444 output face 143, also typically such that SLM 444 is in contact with output face 143.

To couple light beams from one optical switching unit to the next in the respective stages of the cascade, a respective mirror prism 470 is optically coupled to second SLM 424 of one optical switching unit and first SLM 422 of the next sequential optical switching unit in the cascade. Mirror prism is disposed such that light beams emerging from output face 143 of second PBS 443 pass through second SLM 424 in one optical switching unit, enter the respective corner prism 470 and are deflected therein and translated along an axis 70 such that the light beams are incident on first SLM 422 of the next sequential optical switching unit so the beams pass through input face 141 of respective first PBS 442 in that optical switching unit.

For ease of illustration, only one representative delay path apparatus 150 comprising mirror prism 152 is illustrated in FIG. 4, with the path of a representative beam B through the cascade shown in dashed lines with arrows indicating the direction of travel. First, second, and third axes 50, 60, and 70, respectively, as illustrated in FIG. 4 are mutually orthogonal. Dependent on the linear polarization orientation of a light beam entering a respective first PBS 442 in one of the optical switching units, the light beam either passes along first axis 50 directly through first PBS 442 and the associated second PBS 444 in that optical switching unit, or the light beam is deflected by 90° in first PBS 442 along the delay path, which is oriented along a second axis 60, into delay path apparatus 150 to be incident on a mirror prism 152. In mirror prism 152 the light beam is deflected by 180° and directed into the associated second PBS 444 of the respective optical switching unit. First and second PBSs 442, 444 are each disposed such that the respective optical beamsplitting interlace in each prism is oriented to effect the deflection of a beam of predetermined polarization in first PBS 442 from a first axis 50 to a second axis 60 (and hence into the delay path apparatus 150) and, in second PBS 444, deflection of the light beam back onto the first axis. Light beams passing between sequentially coupled optical switching units are translated in corner prism 470 across third axis 70 and deflected so as to be aligned on the respective first axis of the next sequential optical switching unit in the cascade. The folded arrangement of this embodiment provides a compact cascade of optical switching devices and is well adapted to the use of beamsplitter blocks and polarization rotation switch blocks as described above.

Figure 5:
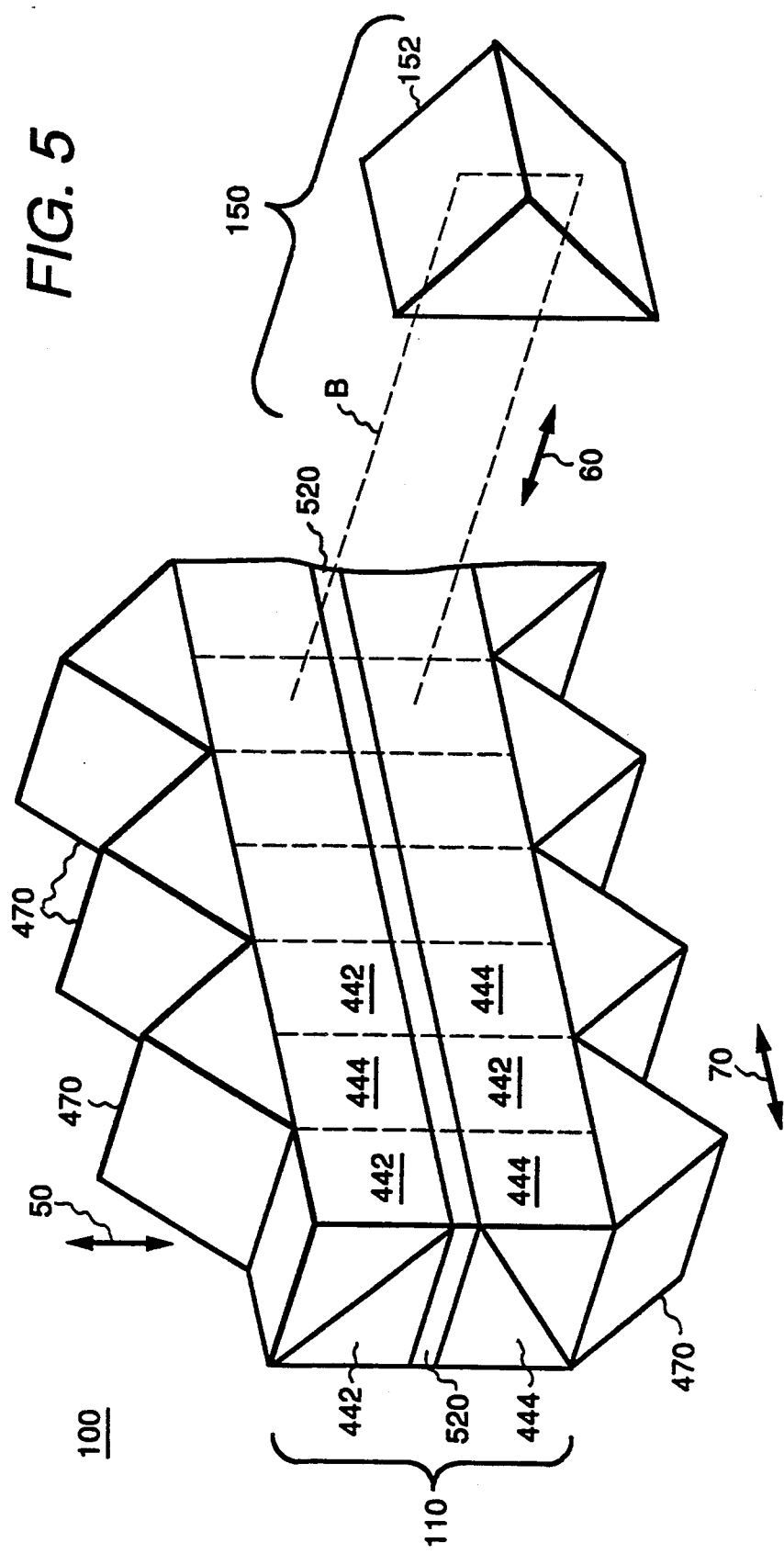
FIG. 5 is a perspective view of a portion of a fifth embodiment of an optical signal processing system comprising the present invention.

A related embodiment is illustrated in FIG. 5, which is similar in all respects to the device described above and illustrated in FIG. 4 except as noted below. In this embodiment a single SLM 520 is used in lieu of first and second SLMs 422, 424 illustrated in FIG. 4. SLM 520 is optically coupled to and disposed between first PBS 442 and second PBS 444. In this device a light beam incident on first PBS 442 in a respective optical switching unit is passed directly through or deflected into delay path apparatus 150 dependent on its linear polarization. Light passing directly through first PBS 442 in an optical switching unit 110 is coupled to SLM 520 and thence to second PBS 444; both s- and p-polarized light beams pass along first axis 50 from SLM 520 into and through second PBS 444, and into the respective corner prism 470 coupled to receive light beams passing from the second PBS. Light beams selected in a respective SLM 520 to have a predetermined polarization orientation undergo deflection onto the delay path in the next sequential optical switching unit in the cascade; light beams having the opposite linear polarization continue passing along the direct path in optical switching units until the light beams undergoes a polarization rotation in a pixel in one of the SLMs in the optical switching units.

Figure 6:
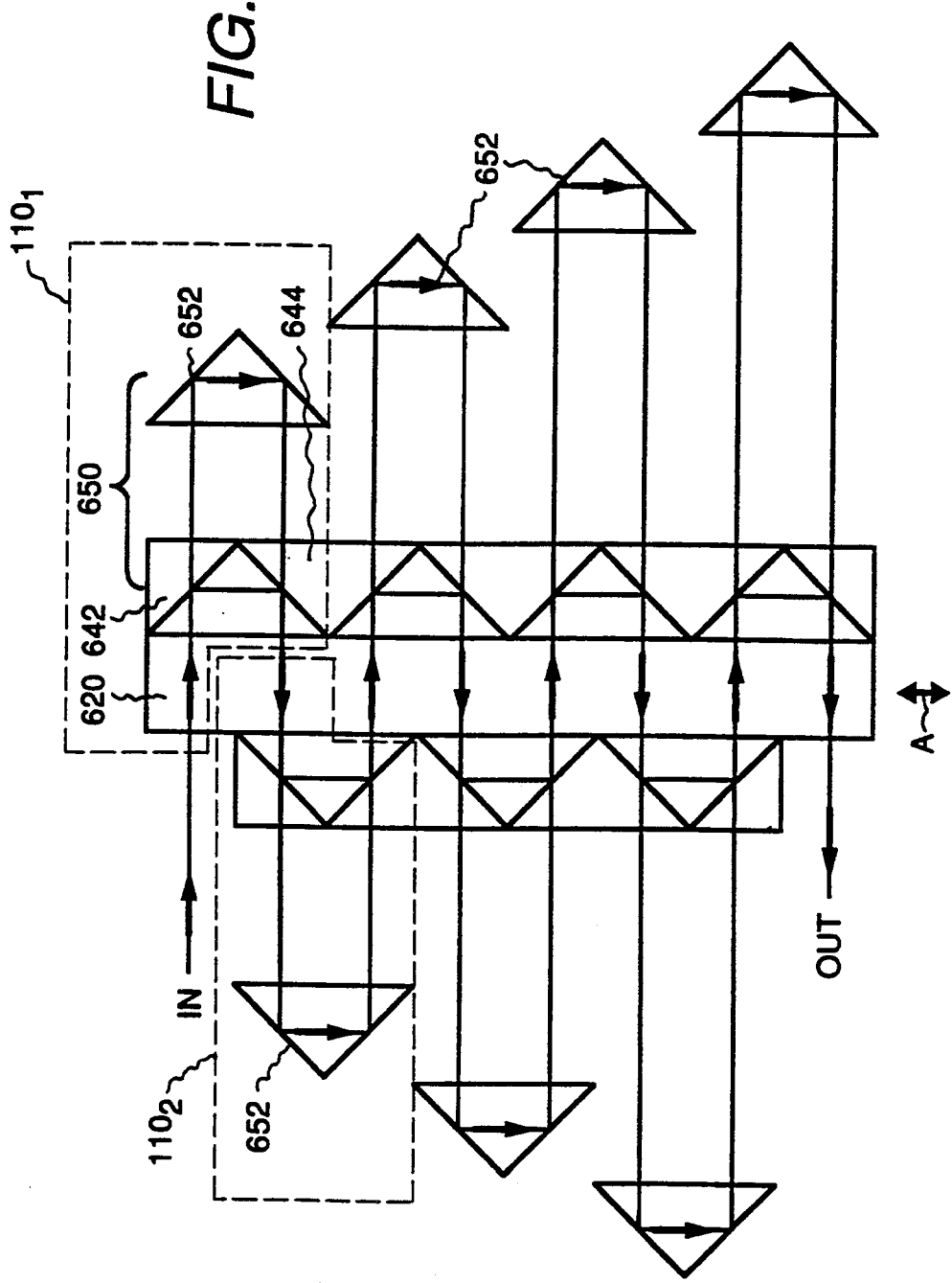
FIG. 6 is a schematic diagram of a portion of a sixth embodiment of an optical signal processing system comprising the present invention.

A still further embodiment of this invention is illustrated in FIG. 6. The integrated cascade arrangement of optical switching units illustrated provides for switching processed light beams in two dimensions (that is, the device is not "folded" as described above with respect to FIGS. 3–5). The device, however, does comprise a single spatial light modulator per optical switching unit, as described above with respect to the device illustrated in FIG. 5. Each respective optical switching unit 110 comprises a respective SLM 620, first and second PBSs 642, 644, and a delay path apparatus 650 comprising a mirror prism 652 or the like, for example a fiber optic cable delay line as described above with regard to FIGS. 1 and 3. A plurality of optical switching units are sequentially optically coupled, and at least a portion of the respective SLMs are aligned along a first axis noted in FIG. 6 by the letter A. Respective delay path apparatuses in alternating ones of the optical switching units are disposed on opposite sides of the plurality of respective SLMs disposed along first axis A.

In operation, light beams incident on the cascade of optical switching devices pass into first optical switching unit $110_1$ and pass through SLM 620 in which the polarizations of respective light beams are selectively adjusted as described above. Light beams pass from SLM 620 into first PBS 642; light having a predetermined polarization that causes it to be deflected in the PBS is deflected into second PBS 644, in which the light is again deflected by 90° and coupled to the respective SLM 620 of the next sequential optical switching unit $110_2$ (per this example). Light having a polarization orientation that does not cause it to be deflected enters delay path apparatus 650 and traverses the delay path, including being deflected by 180° and directed into second PBS 644 along an axis that causes the light to pass directly through second PBS 644 and into SLM 620 of the next succeeding optical switching unit. This arrangement facilitates fabrication as a polarization rotation switch block can be used for portions of the plurality of SLMs in respective sequentially coupled optical switching units.

Each of the embodiments described above further have a structure that is readily adapted to fabricating a device having relatively small time delays, that is, the length of the delay path can be made relatively short. Short delay times are advantageous in allowing the use of higher frequencies in phased array radars. In each of the embodiments of this invention, the delay path apparatus can be disposed in close physical proximity to the polarizing beamsplitter/spatial light modulator combinations to provide an optical switching unit capable of generating a relatively short time (e.g., picoseconds or shorter) delay in an optical signal. Further, close proximity of the delay path apparatus with the respective PBSs and SLMs makes possible a structure in which there is only a minimal or no gap between the delay path assembly and the PBS, which reduces the possibility of light beams being deflected in passing from one optical medium, e.g., the glass of the PBS, through air for example, to a second optical medium, such as the glass of the mirror prism assembly.

While only certain features of the invention have been illustrated and described herein, many modifications and changes will occur to those skilled in the art. It is, therefore, to be understood that the appended claims am intended to cover all such modifications and changes as fall within the true spirit of the invention.

What is claimed is:

1. An optical signal control system comprising:
    a spatial light modulator (SLM); and
    a delay assembly optically coupled to said SLM to comprise an optical switching unit, said delay assembly comprising a single polarizing beamsplitter (PBS) coupled to a delay path apparatus;
    said PBS being disposed to direct an incident light beam between a direct path and a delay path in said optical switching unit in dependence on the linear polarization of the incident light beam, said PBS comprising a cube polarizing beam splitter having a first axis disposed perpendicular to a first pair of opposing faces of the cube and a second axis disposed perpendicular to a second pair of opposing faces of said cube:
    said first pair of opposing faces comprising a switching unit input face disposed to receive light beams passing along said first axis that are incident on said PBS and a switching unit output face disposed opposite the input face;
    said second pair of opposing faces including respectively a delay path entry face and a delay path exit face;
    said delay path apparatus being optically coupled to said PBS such that light beams having the predetermined linear polarization to be deflected in said PBS towards said delay path pass from said delay path entry face into said delay path apparatus and pass from said delay path apparatus into said PBS via said delay path exit face; and
    said PBS being further disposed such that light beams having the selected linear polarization to pass along said delay path are further deflected after entering said PBS to pass from said switching unit output face along said first axis.

2. The system of claim 1 wherein said delay assembly further comprises a beam directing mechanism selected from the group comprising mirrors and optical fibers.

3. The system of claim 2 wherein said SLM comprises an army of independently controllable liquid crystal pixels.

4. The system of claim 1 wherein each respective switching unit SLM is coupled to the corresponding switching unit PBS input face.

5. The system of claim 2 wherein said optical signal control system comprises a plurality of said optical switching units optically coupled in a cascade;
    each respective switching unit PBS being coupled along its second face to a respective switching unit SLM;
    each respective switching unit delay assembly being coupled to receive light beams from the next succeeding switching unit PBS in the cascade such that light having the predetermined polarization to be deflected onto the delay path enters said respective switching unit delay assembly, said respective switching unit delay assembly further being disposed such that light passing along said delay path is deflected to enter said respective switching unit PBS along said deflection axis.

6. The system of claim 5 wherein at least one of said switching unit delay assemblies is disposed with respect to adjoining optical switching units such that substantially no air gap exists at the coupling between said delay assembly and corresponding ones of said PBSs.

7. The system of claim 5 further comprising a lens optically coupled to one of said optical switching units and disposed to collimate light beams passing therethrough.

8. An optical signal processing system comprising:
    a plurality of optical switching units sequentially optically coupled in a cascade arranged along a first axis;
    each of said optical switching units comprising at least one polarizing beam splitter (PBS), at least one spatial light modulator (SLM) respectively optically coupled to said at least one PBS, and a respective delay path apparatus optically coupled to said at least one PBS, each of said at least one PBSs having a direct path input face and an output face disposed opposite to one another along a second axis and further having a first and a second deflection path face disposed opposite to one another along a third axis, said first, second, and third axes each being orthogonal to the other, each of said PBSs being disposed to deflect light into a delay path or direct path dependent on the linear polarization of the incident light beam.

9. The system of claim 8 wherein at least a portion of PBSs in respective ones of said plurality optical switching units comprise sequentially adjoining contiguous segments of a beamsplitter block.

10. The system of claim 9 wherein at least a portion of SLMs in respective ones of said optical switching units comprise sequentially adjoining contiguous segments of a polarization rotation switch block.

11. The system of claim 10 wherein each of said SLMs comprises an array of liquid crystal pixels.

12. The system of claim 11 wherein each of said optical switching units comprises one and only one PBS and said first deflection path face of said PBS is coupled to the delay path input and the second deflection path face of said PBS is coupled to the delay path return, said delay path apparatus comprising at least one delay path optical fiber coupled between said first deflection path face and said second deflection path face.

13. The system of claim 12 further comprising at least one coupling optical fiber coupled between the respective output face of one of said at least one optical switching units and the respective input face of the next sequentially coupled optical switching unit.

14. The system of claim 13 further comprising a plurality of coupling optical fibers disposed between respective sequentially coupled optical switching units, said plurality of coupling optical fibers being disposed in an array having a pattern corresponding to the optical switching unit SLM liquid crystal pixel array.

15. The system of claim 11 wherein:
    each of said optical switching units comprises a respective PBS pair having first and second PBSs optically coupled to one another.

16. The system of claim 15 further comprising:

a plurality of corner prisms, each of said corner prisms being disposed across adjoining end portions of respective optical switching unit PBS pairs such that light beams emanating from one optical switching unit are coupled to the next sequential optical switching unit in said cascade.

17. The system of claim 16 wherein each respective optical switching unit delay path apparatus is optically coupled to respective PBS pairs and said first PBS is disposed such that light of a predetermined polarization is deflected along said third axis to enter said delay path apparatus.

18. The system of claim 17 wherein at least a portion of said delay path apparatuses comprise respective light reflection devices disposed such that light deflected into said delay path assembly from respective first PBSs is deflected by substantially 180° and oriented to be incident on a deflection face of the respective second PBS in said optical switching unit.

19. The system of claim 18 wherein said light reflection surfaces are selected from the group consisting of prisms, mirrors, and optical fibers.

20. The system of claim 19 further comprising a plurality of first and second SLMs, each of said first SLMs being coupled to a respective direct path input face of a respective first PBS in each optical switching unit and each of said second SLMs being optically coupled to a respective output face of a respective second PBS in each optical switching unit.

21. The system of claim 19 wherein said at least one SLM is disposed between the output face of said first PBS and the direct path input face of the said second PBS in each optical switching unit.

22. An optical signal control system comprising:
 a plurality of optical switching units sequentially optically coupled;
 each of said optical switching units comprising a respective spatial light modulator (SLM) and a respective delay assembly optically coupled to one another, at least a portion of the plurality of SLMs in respective optical switching units being disposed along a first axis;
 each delay assembly further comprising first and second polarizing beam splitters (PBSs) and a delay path apparatus, said PBSs being optically coupled to each other and to said delay path apparatus and disposed so that light of a predetermined linear polarization passes into said delay path apparatus;
 sequentially alternating respective ones of said delay path apparatuses being disposed on opposite sides of respective ones of said pluralities of SLMs, whereby light entering each switching unit passes through said respective SLM thereof and into said respective delay path apparatus thereof in which the light is deflected such that light from one optical switching unit passes through the respective SLM of the next sequential optical switching unit.

23. The system of claim 22 wherein each respective one of said SLMs comprises a respective array of liquid crystal pixels.

24. The system of claim 23 wherein each of said delay path apparatuses comprises apparatuses selected from the group consisting of optical fibers, prisms, and mirrors.

* * * * *